April 7, 1953 C. H. HOEPPNER ET AL 2,634,346

PULSE WIDTH DISCRIMINATOR

Filed Oct. 9, 1945 3 Sheets-Sheet 1

PULSE RECEIVING SYSTEM

Inventors
CONRAD H HOEPPNER
CARL HARRISON SMITH, JR.

By Ralph L Chappell

Attorney

April 7, 1953 C. H. HOEPPNER ET AL 2,634,346

PULSE WIDTH DISCRIMINATOR

Filed Oct. 9, 1945 3 Sheets-Sheet 2

Inventors
CONRAD H HOEPPNER
CARL HARRISON SMITH, JR
By Ralph L Chappell
Attorney

PULSE WIDTH DISCRIMINATOR

Filed Oct. 9, 1945 3 Sheets-Sheet 3

Inventors
CONRAD H HOEPPNER
CARL HARRISON SMITH, JR.
By Ralph L Chappell
Attorney Patented Apr. 7, 1953 2,634,346

UNITED STATES PATENT OFFICE 2,634,346

PULSE WIDTH DISCRIMINATOR

Conrad H. Hoeppner, Washington, D. C., and
Carl Harrison Smith, Jr., Arlington, Va.

Application October 9, 1945, Serial No. 621,401

10 Claims. (Cl. 250—27)

(Granted under Title 35, U. S. Code (1952), sec. 266)

This invention relates in general to electronic circuits having discriminatory response characteristics and in particular to an electronic circuit for pulse time duration discrimination.

In radio, radar, television, and other electronic fields, it frequently occurs that a number of different potential variations may exist at the input to a component electronic circuit either fortuitously or by intention. If all of such variations are not to be impressed upon the component circuit, it is necessary to provide an intervening circuit with the ability to discriminate between those variations intended for ultimate application to the component circuit and those variations the effect of which would be undesirable. Some characteristic or characteristics of the potential variations must be selected as a basis for pulse discrimination and among such characteristics are time duration, polarity, rate of change, and amplitude.

Given such a basis and a suitable intervening circuit, many useful applications may result. For example, a means of pulse coding is provided in which intelligence is conveyed by means of electrical impulses endowed with the chosen characteristic in the form in which it will be favored by the receiver of the message. All those electrical impulses not so endowed, whether they be deliberately introduced so as to disguise a communication for secrecy purposes or reach the receiver from man-made or natural sources so as to constitute accidental or deliberate interference, are rejected by the intervening circuit. An obvious extension of such a code pulsing system is to provide a receiver with a plurality of intervening circuits, each so constructed as to select and favor its particular type of electrical impulse. In this way a multiplicity of communication channels may be provided. The endowment of an electrical impulse with the chosen characteristic in the form in which it will be favored does not necessarily operate to prevent a variation in another characteristic which can be put to a useful purpose. Thus, a pulse which may be restricted as to its time duration so as to be favored by a pulse width discrimination circuit, can also be amplitude modulated so as to convey intelligence or provide a second means of dicrimination.

It is an object of this invention to provide a circuit which is responsive only to potential variations or electrical impulses of a certain time duration and which is unresponsive to potential variations or electrical impulses of all other time durations.

It is another object of this invention to provide a circuit which can be employed between a source of potential variations or electrical impulses and the receiver thereof as an intervening circuit which shields from such receiver all variations or pulses except those having a certain definite preselected time duration.

It is another object of this invention to provide a discrimination circuit the discriminatory action of which is based upon certain definite characteristics of the applied input signal.

Other objects and features of this invention will become apparent upon a careful consideration of the following detailed description when taken together with the accompanying drawings in which.

Figure 1:
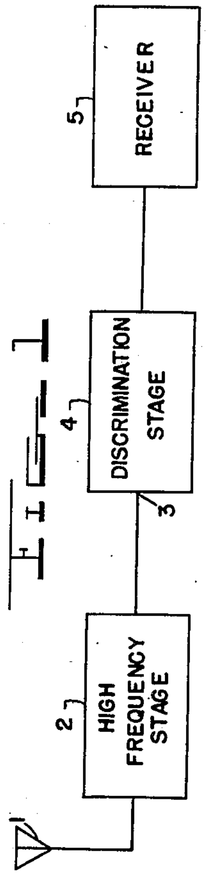
Fig. 1 is a simple block diagram of a pulse receiving system utilizing one embodiment of this invention.

Reference is now had in particular to Fig. 1 which is illustrative of a pulse receiving system wherein a discrimination circuit is employed to repulse undesired video signals in a pulse receiving system. Pulses or bursts of high frequency energy received by antenna 1, amplified and detected by high frequency stage 2 are impressed, in the form of the envelope of the high frequency pulses of energy, to input 3 of discrimination stage 4. Since the pulses of high frequency energy reaching antenna 1 may comprise not only a desired signal but also man-made and fortuitous interfering signals of a frequency which high frequency stage 2 will not reject, and since high frequency stage 2 may itself be a source of interfering signal, it is the function of discrimination stage 4 to shield from receiver 5 all pulses not having the time duration characteristics of the desired signal. The output circuit of high frequency stage 2, not shown, is so constructed that only signals of negative polarity and steep leading and trailing edges are applied to input 3. Further, these signals are all of sufficient amplitude to drive the first stage of the discriminator below cutoff potential, the result being that, as they are applied to discrimination stage 4, their only substantial difference lies in the characteristic of time duration.

Figure 2:
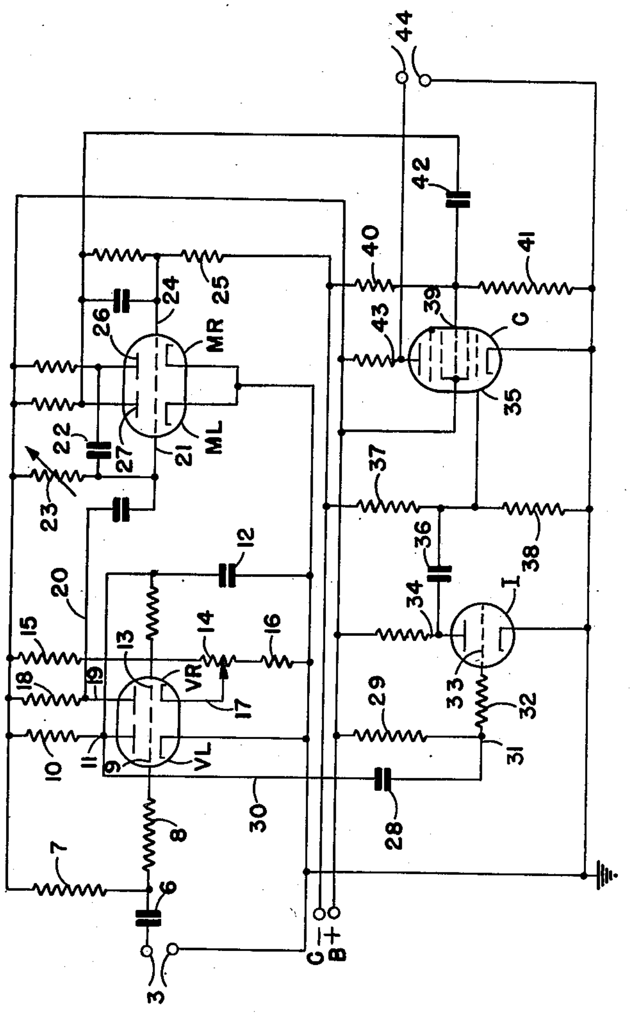
Fig. 2 is the circuit diagram of one embodiment of this invention.

In general, the pulse width discrimination taught by this invention is accomplished by requiring coincidence between a period of responsiveness initiated by the leading edge of an electrical impulse and a sharp pulse initiated by the trailing edge. So as to discriminate against electrical impulses of too short a duration, the period of responsiveness initiated by the leading edge is delayed in time therefrom by means of a time constant circuit. If the trailing edge of the applied electrical impulse arrives during the intervening delay there is anti-coincidence. If the trailing edge arrives after the intervening delay and after the period of responsiveness which follows immediately, there is again anticoincidence. The remaining condition, which comprises the arrival of the trailing edge after the delay but during the responsive period, represents that which provides coincidence. It is possible to determine the existence of this coincidence by a variety of methods, one of which consists of biasing a multigrid vacuum tube in such a manner that positive signals must be applied synchronously to two of its grids in order to cause plate current flow. Such an arrangement is shown in Fig. 2 to which reference is now had.

In particular, electrical impulses of various widths may be applied at input terminals 3 only certain of which possess the time width which the circuit is designed to favor. These pulses are applied to grid 9 of vacuum tube element VL, represented by the left hand section of a twin triode vacuum tube, through a coupling circuit comprising capacitor 6 and resistors 7 and 8. The time constant of this coupling, determined by capacitor 6 and resistor 7, is long compared to the duration of any pulse applied to input 3 so that capacitor 6 receives but little charge during an applied pulse. As hereinbefore described all pulses reaching input 3 are of negative polarity, and possess steep leading and trailing edges. Further, they are of sufficient amplitude to increase the bias on tube VL from zero value, which it assumes by virtue of grid current flow from B+ through resistors 7 and 8 to ground during the quiescent condition of the circuit, to well below plate current cutoff throughout the duration of the pulse.

The abrupt cessation of current flow through tube VL and hence through resistor 10 which occurs coincidental with the leading edge of an applied pulse would result ordinarily in an abrupt rise in potential at plate 11. This abrupt rise is tempered, however, by the necessity of charging capacitor 12 connected between anode 11 and ground. Thus, a controlled increase in potential occurs at anode 11 during an applied pulse the rate of which may be fixed at any desired value by proper choice of the values of capacitor 12 and resistor 10. This process will be recognized as that commonly referred to as integration and may be utilized to provide a very nearly linear increase in voltage at anode 11 followed by an abrupt drop in potential as the trailing edge of the applied pulse unbiases tube VL and thereby provides a low resistance path for the discharge of capacitor 12. Thus, each electrical impulse impressed at terminals 3 causes a sawtooth pulse to appear at anode 11 the amplitude of which is a nearly linear function of the impulse duration.

Vacuum tube element VR, to grid 13 of which is applied the sawtooth pulses appearing at anode 11, has been supplied with variable cathode biasing by means of a potentiometer or tapped resistor 14. By proper choice of resistors 15 and 16 in series with resistor 14 between positive B+ voltage and ground, the potential of cathode 17 may be selected as desired by adjustment of resistor 14. The greater the potential selected for cathode 17, the higher must be the potential rise at anode 11 before tube VR is unbiased and conducts plate current through resistor 18 so as to cause a negative signal to appear at anode 19. Thus, the interval of time between the arrival of the leading edge of a pulse at input 3 and the appearance of a negative signal at anode 19 may be varied by adjustment of resistor 14. This interval of time constitutes a delay which may be readily changed according to the width of pulse to be favored.

The negative signal appearing at anode 19, delayed in time from the leading edge of the applied pulse, is applied, through lead 20, to the multivibrator stage comprising vacuum tube elements ML and MR and associated circuit components. This multivibrator is of the "one-shot" variety in that it has only one stable state of equilibrium (ML conducting and MR non-conducting) but which will maintain, upon receipt of a negative signal at grid 21, a second state (MR conducting and ML non-conducting) for a definite interval of time which may represent a period of responsiveness as hereinafter described. The time interval for which the second state of the multivibrator may be maintained is determined by the time constant circuit formed by capacitor 22 and resistor 23. As ML, which is quiescently conducting by virtue of the connection of grid 21 to B+ through resistor 23, and MR, which is quiescently non-conducting by virtue of the connection of its grid 24 to C— through resistor 25, are driven into non-conduction and conduction respectively to produce the period of responsiveness represented by the multivibrator's second state, plate 26 of MR is thereby driven sharply negative and condenser 22, which is fully charged, holds grid 21 of ML below cutoff until it partially discharges through resistance 23. The rate at which capacitor 22 discharges may be varied by adjustment of the resistance in its discharge path and the duration of the period of responsiveness is thereby variable. In the circuit of Fig. 2 this adjustment is accomplished by variation of resistor 23.

Thus, in the circuit of Fig. 2 the leading edge of an electrical impulse at input 3 results in the generation of a sawtooth pulse at anode 11 which, after a selectable delay, causes a negative pulse to appear at anode 19 which in turn causes the establishment of a period of responsiveness of selectable duration represented by the second state of the multivibrator. In effect, therefore, the applied pulse leading edge initiates, after a selectable delay, a period of responsiveness of selectable duration.

Since ML is rendered non-conducting during the second state of the multivibrator its anode 27 rises abruptly to approximately B+ potential and the period of responsiveness is thus characterized by the appearance of a rectangular positive pulse at anode 27. As hereinbefore mentioned, there are various methods by which coincidence between the responsive period initiated by the applied pulse leading edge and the instant of time marked by the trailing edge of the applied pulse may be detected. In the circuit of Fig. 2, the aforementioned rectangular positive pulse and a sharp positive pulse initiated by the applied pulse trailing edge are impressed upon separate control grids of multigrid vacuum tube C and permit conduction by that tube so as to cause a signal at its anode only when the impression is synchronous.

The sharp positive pulse which marks the end of the applied pulse is obtained from anode 11 of tube VL by differentiation of the sawtooth pulse and inversion of the differentiated result. Capacitor 28 and resistor 29 constitute a differentiating circuit which has a short time constant. The effect of the sloping leading edge of the sawtooth pulse which reaches the circuit from anode 11 through lead 30 is to cause capacitor 28 to be charged during the applied pulse but to cause very little change of potential at point 31. This slight change of potential, when translated to grid 33 of tube I through resistor 32, becomes negligible. The effect of the abrupt negative going trailing edge of the sawtooth pulse, however, is to drive grid 33 sharply negative for a short period of time thereby causing a sharp positive pulse to appear at anode 34 of tube I. This sharp positive pulse is applied to first control grid 35 of tube C through capacitor 36 so as to overcome the cutoff bias supplied by the connection of grid 35 to C— potential through resistor 37 and ground through resistor 38. Likewise, second control grid 39 of tube C in the absence of an applied signal, is held below cutoff by connection to C— potential through resistor 40 and permits conduction by tube C only during the rectangular positive pulse which it receives through capacitor 42 from anode 27 of the multivibrator. It will be seen that both grid 35 and grid 39 must be unbiased simultaneously for plate current to flow in tube C and a signal to appear at anode 43 and hence at output 44. This simultaneous unbiasing requires that the pulse initiated by the trailing edge of the applied pulse appear at grid 35 during the period of responsiveness characterized by the appearance of the rectangular positive pulse at grid 39 initiated by the leading edge of the applied pulse. If the applied pulse is too narrow, its trailing edge pulse arrives before the rectangular positive pulse appears at grid 39. If the applied pulse is too wide its trailing edge pulse arrives after grid 39 is unbiased. Thus pulses of too small and too great a duration are discriminated against and cause no output at terminals 44, while pulses of the preselected duration are favored and cause tube C to conduct and a negative signal to appear at output terminals 44.

Figure 3:
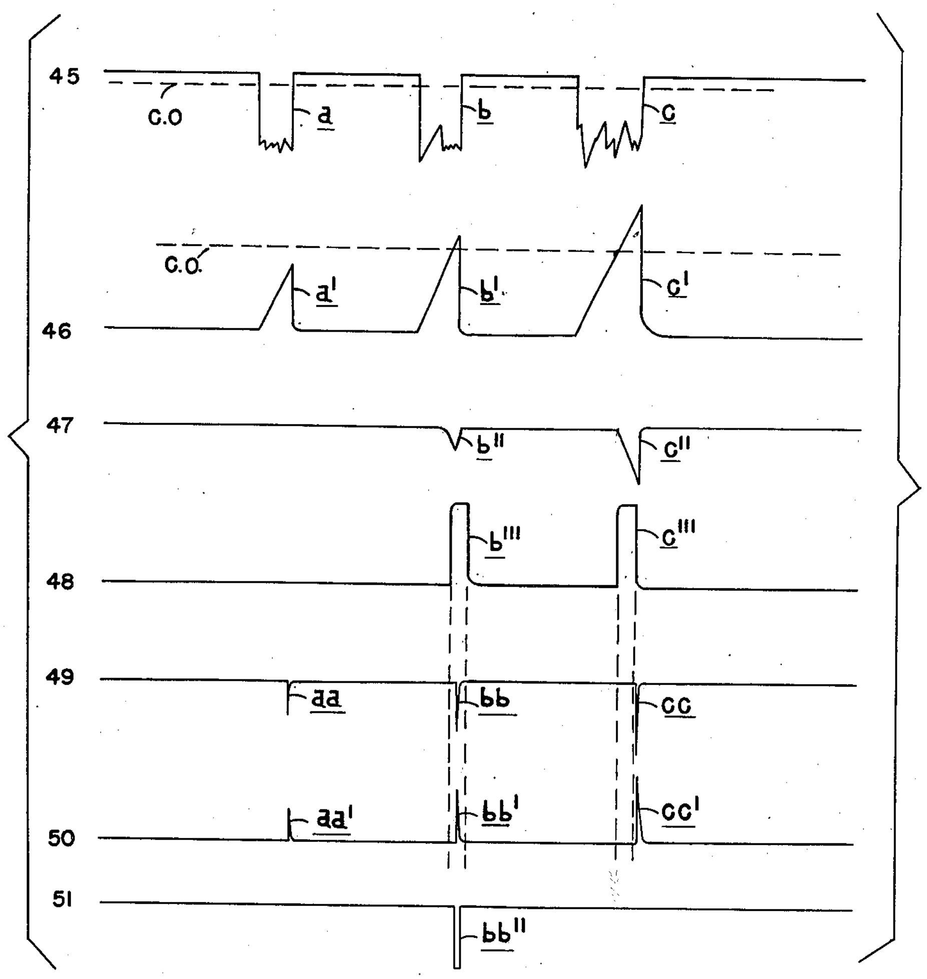
Fig. 3 is a series of waveforms useful in explaining the operation of the circuit of Fig. 2.

In Fig. 3 are shown several waveforms which illustrate the action of the circuit of Fig. 2. Waveform 45 is representative of a series of pulses *a*, *b*, and *c*, applied to input 3. Of this series, pulse *b* is of a duration such as to be favored by the discrimination while pulse *a* is too narrow and pulse *c* is too wide and are discriminated against. Pulse *a* causes sawtooth pulse *a'* of waveform 46 to be generated at the plate of tube VL, the amplitude of which fails to reach the cutoff potential of tube VR marked by line C. O. Multivibrator ML and MR remains untriggered and grid 39 of tube C remains biased in response to pulse *a* so that the trailing edge pulse is rendered impotent and no output appears at terminals 44. Pulse *b*, however, causes sawtooth pulse *b'* of waveform 46 to be generated which exceeds the cutoff potential of tube VR and triggers multivibrator ML and MR into the period of responsiveness during which grid 39 is unbiased by the rectangular positive pulse appearing at anode 27 of tube ML. Negative pulse *b''* of waveform 47 represents the pulse which appears at anode 19 of tube VR when it is unbiased and triggers the multivibrator while rectangular positive pulse *b'''* of waveform 48 represents the pulse which reaches grid 39 of tube C from the multivibrator to create the period of responsiveness. The sawtooth pulse *b'*, when applied to the input circuit of tube I causes a differentiated variation represented by pulse *bb* of waveform 49 which is inverted by tube I and applied as positive pulse *bb'* of waveform 50 to grid 35 of tube C. Since pulses *b'''* and *bb* are synchronous, tube C is unbiased and output pulse *bb''* of waveform 51 appears at terminals 44 in response to pulse *b* of the preselected duration. Pulse *c* also is able to create the period of responsiveness represented by pulse *c'''* of waveform 48 but is of too great a duration and its trailing edge pulse *cc'* arrives after pulse *c'''* has disappeared. This non-synchronous operation fails to unbias tube C and cause an output pulse at 44.

Had it been desirable to favor both pulse *b* and pulse *c*, resistor 23 of the multivibrator could have been adjusted to lengthen the period of responsiveness *c'''* sufficiently to include the instant when pulse *cc'* appeared. On the other hand, had it been desirable to favor both pulse *a* and *b*, it would have been necessary to adjust resistor 14 of tube VR and resistor 23 of the multivibrator until the amplitude of sawtooth pulse *a'* was sufficient to cause VR to conduct and until the period of responsiveness had a duration great enough to also include the instant of time when pulse *bb'* appeared.

To those versed in the art will occur a variety of methods of detecting the existence of coincidence between the period of responsiveness and the trailing edge of the applied pulse. For example, the applied pulse may be differentiated and its trailing edge caused to yield a positive pulse which would remove the bias from grid 35. This arrangement avoids the use of a tube for inversion such as tube I. The inversion tube may also be eliminated from the circuit by applying the negative pulse which appears at point 31, to the cathode of coincidence tube C which then need only be a triode. Still another coincidence detector which eliminates the inversion tube may be used which superposes the positive pulse resulting from the differentiation of the applied pulse on the rectangular positive pulse from plate 27 of the multivibrator in such a manner as to create a combined pulse of sufficient amplitude to unbias tube C only when the combination is synchronous.

Figures 4, 5:
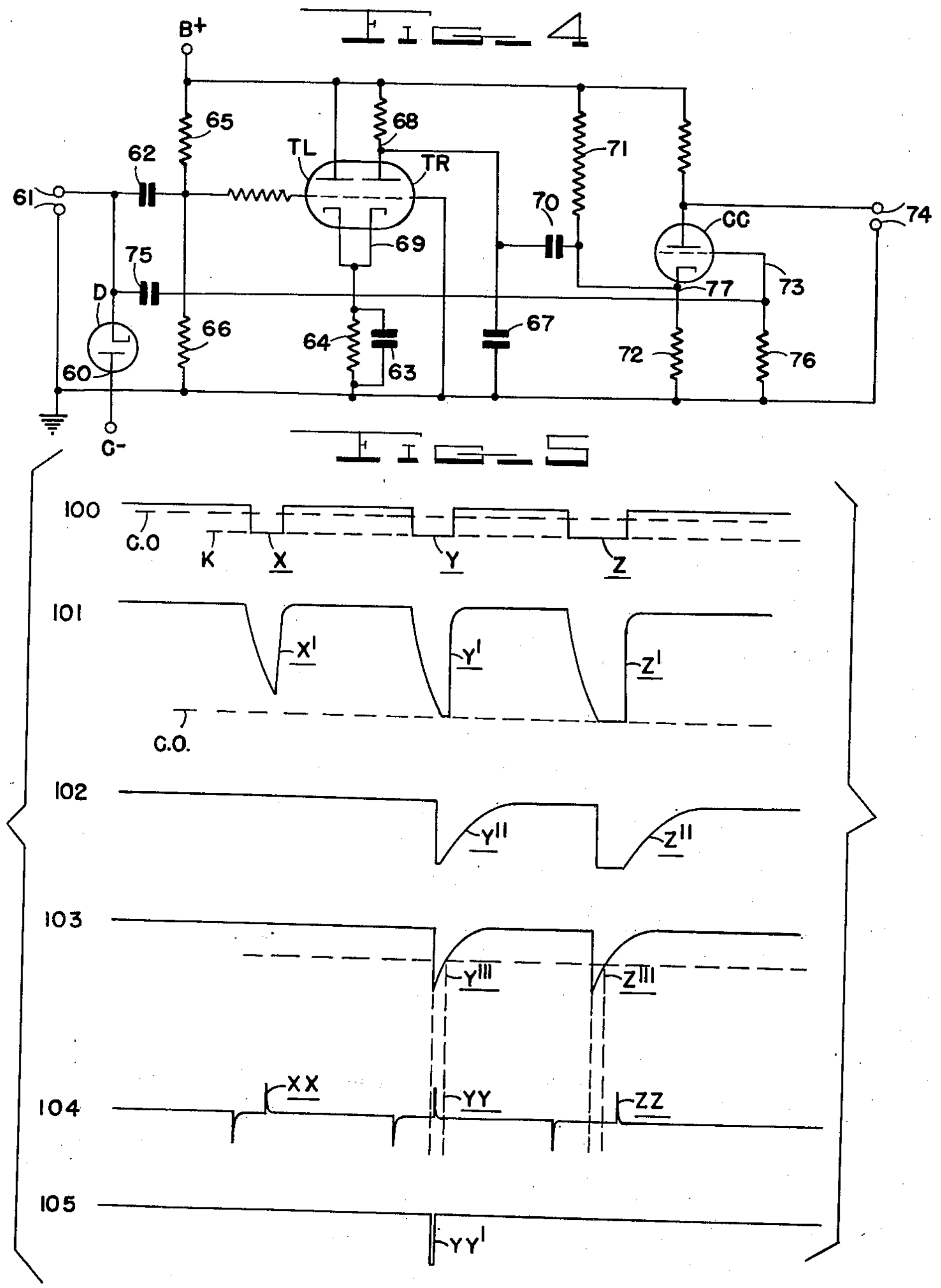
Fig. 4 is the circuit diagram of a variant embodiment of this invention.
Fig. 5 is a series of waveforms useful in explaining the operation of the circuit of Fig. 4.

A variant embodiment which incorporates several of these possible variations is shown in Fig. 4. Here again time constant circuits are employed to generate a pulse representing a period of responsiveness a predetermined interval of time after the application to the circuit of the leading edge of an applied pulse. If the applied pulse trailing edge arrives in synchronism with the period of responsiveness an output pulse is produced to thereby signal the favored pulse width characteristic. Since the actual applied pulse, which may have variations in amplitude exceeding a minimum first stage cutoff potential hereinbefore described, is differentiated to create the trailing edge pulse, it is desirable to provide some means of amplitude limiting. Limiting of the amplitude of the pulses reaching the discriminator proper reduces the pulse shape differences solely to one of duration. In the circuit of Fig. 4, negatively biased diode D has its plate 60 so connected to C— potential that, when the applied pulse amplitude tends to exceed C−, diode 60 conducts to limit the negative excursion appearing between input terminals 61 to a uniform value. In Figure 5, level K of waveform 100 indicates this uniform value and *x*, *y* and *z* the rectangular pulses resulting from the application of three pulses such as *a*, *b*, and *c* of Fig. 3 to input 61.

The amplitude thus limited and the time constant of the circuit (capacitor 62 and resistors 65 and 66) coupling applied pulses to vacuum tube element TL is nevertheless such that tube TL is biased off for the duration of any applied pulse.

During the interval for which TL is biased off and no current flows through TL to maintain the quiescent operating charge on capacitor 63, capacitor 63 starts to discharge exponentially through resistor 64. Thus there appears at the cathodes of TL and TR a potential which decreases with time in response to each pulse applied to terminals 61. If the charge on capacitor 63 and hence the potential at the cathodes of TL and TR drops to a predetermined level, tube TR conducts and the charge on 63 is stabilized as tube TR assumes the conducting condition dictated by its operating characteristics. By proper choice of circuit values, such as capacitor 63 and resistor 64 in the cathode circuit of TL and TR, for example, or resistors 65 and 66 which determine the quiescent charge on capacitor 63, the interval required after a pulse is applied at input 61 before TR conducts may be selected.

In the quiescent condition of the discriminator, when TR is held non-conducting, anode 68 is at B+ potential and shunt capacitor 67 is fully charged. When TR, which is so chosen as to have sharp cutoff characteristics, is driven conducting by the decreasing potential at its cathode 69 capacitor 67 discharges rapidly through TR and resistor 64 down to the anode potential which characterizes the stable conducting condition of TR. The steep, negative-going wavefront thus produced is coupled to tube CC by means of the differentiating circuit comprising capacitor 70 and resistors 71 and 72 impress upon the cathode of tube CC a negative pulse. This negative pulse, which appears only in response to an input pulse at terminals 61 which exceeds in duration a predetermined interval of time is always of uniform amplitude since the steep wavefront from which it is derived is limited in amplitude by the conducting anode potential of tube TR. The uniform negative pulse appearing at the cathode of tube CC is of such strength that it removes most of the bias supplied to that tube by the cathode biasing circuit comprising resistor 71 connected to B+ and resistor 72 connected to ground. The remaining bias is just sufficient to hold tube CC non-conducting as long as its grid 73 is held at ground potential. Under these conditions, a positive signal impressed upon grid 73 will cause tube CC to conduct and a negative output signal to appear at output terminals 74. In this manner, a period of responsiveness is created a predetermined interval of time after the leading edge of an incoming pulse. The length of this period of responsiveness is, in general, determined by the values chosen for capacitor 70 and resistors 71 and 72 to be short compared to the duration of a pulse which the circuit is designed to favor.

An applied pulse of the favored width, or greater, which is transformed by tubes TL and TR and associated circuits into the aforementioned negative cathode pulse at tube CC, is also differentiated by the circuit comprising capacitor 75 and resistor 76. The purpose of this differentiation is to apply to grid 73 of tube CC a negative pulse and a positive pulse in response to the leading and trailing edges respectively of applied pulses. The leading edge negative pulses only serve to increase the bias on tube CC and are therefore impotent while the trailing edge positive pulses, if they arrive during the existence of the negative pulse at cathode 77 of tube CC which represents the period of responsiveness, cause tube CC to conduct and an output pulse to appear at terminals 74. Thus tubes TL and TR generate, in response to applied pulses, pulses which are delayed in time from the leading edges of such applied pulses and the differentiating circuit comprising capacitor 75 and resistor 76 generate applied pulse trailing edge pulses which, if synchronous with the above delayed pulses, serve to unbias tube CC and thereby cause an output signal at terminals 74.

This action is illustrated by the waveforms of Fig. 5 in which waveform 100 is representative of a series of diode limited input pulses *x*, *y*, and *z*. Of these three pulses, only pulse *y* is of the width to be favored by the pulse width discriminator of Fig. 4 while pulse *x* is of too narrow a width and pulse *z* is too wide. Pulse *x* cuts off the flow of current in tube TL for the interval of its duration and capacitor 63 discharges through resistor 64 to generate, at the cathode of tube TL, the decreasingly negative potential represented by pulse $x'$ of waveform 101. This potential is of insufficient amplitude to reach the level C. O. of that waveform necessary to unbias tube TR and pulse *x* is therefore unable to create at tube CC the required period of responsiveness. Since the entire bias remains on the cathode of tube CC, the trailing edge positive pulse generated by capacitor 75 and resistor 76 represented by pulse *xx* of waveform 104 is impotent and no output pulse appears at terminals 74.

Pulse *y*, on the other hand, is of sufficient duration to cause capacitor 63 to discharge down to level C. O. of waveform 101 and tube TR conducts to form at its anode 68 the steep wavefront represented by pulse $y''$ of waveform 102. This steep wavefront is differentiated to produce, at cathode 77 of tube CC, negative pulse $y'''$ of waveform 103. Trailing edge pulse *yy* of waveform 104 appears at grid 73 synchronously with pulse $y'''$ at cathode 77 so that tube CC is unbiased and the negative signal $yy'$ which appears at terminals 74 bespeaks the favored width characteristic of the applied pulse.

Pulse *z*, which likewise causes a negative pulse to appear at cathode 77 represented by pulse $z'''$ of waveform 103, is so wide that trailing edge pulse *zz* of waveform 104 arrives at grid 73 out of synchronism and no output signal appears at terminals 74.

A number of possible variations of the circuit of Fig. 4 may be made to suit the requirements of particular situations. For example, tube TL could have been connected as a conventional positive sawtooth generator and its output employed to remove the bias at the grid of tube TR after a predetermined interval. Similarly, the grid of tube TL may be held at B+ potential quiescently and a positive bias supplied to the grid of tube TR if sharper pulse discrimination is desired.

It will be apparent that a time duration or pulse width discrimination circuit constructed in accordance with the teachings of this invention will have a wide variety of applications in radio, radar, television and other electronic fields whenever discrimination between voltage variations is desirable and the time durations of such variations can be used as the basis for such discrimination. It will also be apparent that a pulse width discrimination circuit constructed as taught by this invention may be used in combination with other circuits, also discriminatory in response, whose action is based on other characteristics of the input signal such as amplitude, polarity, repetition rate, or rate of change.

Since certain further changes may be made in the foregoing constructions and different embodiments of the invention may be made without departing from the scope thereof, it is intended that all matter shown in the accompanying drawings or set forth in the accompanying specification shall be interpreted as illustrative and not in a limiting sense.

The invention described herein may be manufactured and used by or for the Government of the United States of America for governmental purposes without the payment of any royalties thereon or therefor.

What is claimed is:

1. A method of pulse duration discrimination comprising, producing in synchronism with the leading edges and for the duration of incoming electrical impulses sawtooth pulses, producing in response to said sawtooth pulses exceeding a preselected amplitude pulses of preselected duration, producing pulses from the trailing edges of said incoming electrical impulses, combining said trailing edge pulses and said pulses of preselected duration which are synchronous, and producing output pulses only in response to said synchronous combination.

2. A pulse width discriminator comprising, vacuum tube means generating in response to and for the duration of applied electrical impulses sawtooth pulses, vacuum tube means generating in response to said sawtooth pulses exceeding a preselected amplitude pulses of preselected duration, means generating pulses from the trailing edges of said applied electrical impulses, means combining said trailing edge pulses and said pulses of preselected duration which are synchronous, and means producing output pulses only in response to said synchronous combination.

3. A pulse width discriminator comprising, vacuum tube means generating in response to and for the duration of applied electrical impulses sawtooth pulses, vacuum tube means generating in response to said sawtooth pulses exceeding a preselected amplitude pulses of preselected duration, means for altering said preselected amplitude, means for altering said preselected duration, means generating pulses from the trailing edges of said applied electrical impulses, means combining said trailing edge pulses and said pulses of preselected duration which are synchronous, and means producing output pulses only in response to said synchronous combination.

4. A pulse width discriminator comprising, vacuum tube means generating in response to and for the duration of applied electrical impulses sawtooth pulses, vacuum tube means generating pulses in response to said sawtooth pulses exceeding a preselected amplitude, means generating in response to last said generated pulses pulses of preselected duration, means generating pulses from the trailing edges of said applied electrical impulses, means combining said trailing edge pulses and said pulses of preselected duration which are synchronous, and means producing output pulses only in response to said synchronous combination.

5. A pulse width discriminator comprising, vacuum tube means generating in response to and for the duration of applied electrical impulses sawtooth pulses, vacuum tube means generating pulses in response to said sawtooth pulses exceeding a preselected amplitude, means generating in response to last said generated pulses pulses of preselected duration, means generating pulses from the trailing edges of said sawtooth pulses, means combining said trailing edge pulses and said pulses of preselected duration which are synchronous, and means producing output pulses only in response to said synchronous combination.

6. A pulse width discriminator comprising, vacuum tube means generating in response to and for the duration of applied electrical impulses sawtooth pulses, vacuum tube means generating pulses in response to said sawtooth pulses exceeding a preselected amplitude, means generating in response to last said generated pulses pulses of preselected duration, resistance capacitance means generating pulses from the trailing edges of said sawtooth pulses, vacuum tube means inverting said trailing edge pulses, means combining said inverted trailing edge pulses and said pulses of preselected duration which are synchronous, and means producing output pulses only in response to said synchronous combination.

7. A pulse width discriminator comprising, vacuum tube means generating in response to and for the duration of applied electrical impulses pulses which increase in amplitude to a predetermined amplitude, vacuum tube means generating pulses in response to first said generated pulses which attain said predetermined amplitude, resistance capacitance means differentiating second said generated pulses, resistance capacitance means differentiating said applied electrical impulses, and vacuum tube means receiving both said differentiation produced pulses and producing output pulses only when the two are synchronous.

8. A pulse width discriminator comprising, vacuum tube means generating in response to and for the duration of applied electrical impulses sawtooth pulses, vacuum tube means generating pulses in response to said sawtooth pulses exceeding a preselected amplitude, means generating in response to last said generated pulses pulses of preselected duration, means generating pulses from the trailing edges of said sawtooth pulses, vacuum tube means adapted to receive both said trailing edge pulses and said pulses of a preselected duration and arranged to produce output pulses in response to the synchronous application of such pulses.

9. In a pulse length discriminator, a pulse generator normally biased beyond cut-off, means utilizing input pulse signals of substantial duration for causing said pulse generator to produce a relatively short pulse a predetermined time after the receipt of each input signal, a normally inoperative inverting and differentiating circuit, means utilizing said input signals for causing said inverting and differentiating circuit to produce a relatively short pulse of the same sense as said first-mentioned relatively short pulse at the termination of each of said input pulse signals, and circuit means for comparing the degree of coincidence of said pulses and producing an output pulse whenever the compared pulses have substantial coincidence.

10. In a pulse length discriminator, a pulse generator normally biased beyond cut-off, means utilizing input pulse signals of substantial duration for causing said pulse generator to produce a relatively short pulse a predetermined time after the receipt of each input signal, a normally inoperative inverting and differentiating circuit, means utilizing said input signals for causing said inverting and differentiating circuit to produce a relatively short pulse of the same sense as said first-mentioned relatively short pulse at the termination of each of said input pulse signals, circuit means for comparing the degree of coincidence of said pulses and producing an output pulse whenever the compared pulses have substantial coincidence, and means for adjusting the times of occurrence of said first-mentioned pulses with respect to the time of receipt of said input signal pulses.

CONRAD H. HOEPPNER.
CARL HARRISON SMITH, Jr.

REFERENCES CITED

The following references are of record in the file of this patent:

UNITED STATES PATENTS

| Number | Name | Date |
|---|---|---|
| 2,359,447 | Seeley | Oct. 3, 1944 |
| 2,418,127 | Labin | Apr. 1, 1947 |

FOREIGN PATENTS

| Number | Country | Date |
|---|---|---|
| 528,192 | Great Britain | Apr. 22, 1939 |